United States Patent
Belser et al.

(10) Patent No.: US 7,164,859 B2
(45) Date of Patent: Jan. 16, 2007

(54) FREE-SPACE DYNAMIC WAVELENGTH ROUTING SYSTEMS WITH INTERLEAVED CHANNELS FOR ENHANCED PERFORMANCE

(75) Inventors: Karl Arnold Belser, San Jose, CA (US); Masud Mansuripur, Tucson, AZ (US); Jeffrey P. Wilde, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 10/229,922

(22) Filed: Aug. 28, 2002
(Under 37 CFR 1.47)

(65) Prior Publication Data

US 2003/0043471 A1 Mar. 6, 2003

Related U.S. Application Data

(60) Provisional application No. 60/375,961, filed on Apr. 27, 2002, provisional application No. 60/315,626, filed on Aug. 29, 2001.

(51) Int. Cl.
*H04B 14/02* (2006.01)
*G02F 6/32* (2006.01)
*G02F 6/34* (2006.01)
*G02F 6/35* (2006.01)
*G02F 26/08* (2006.01)

(52) U.S. Cl. .............................. 398/49; 398/86; 398/87; 398/88; 398/24

(58) Field of Classification Search ................ 359/124, 359/127, 128, 129, 130, 131; 385/16, 17, 385/18, 24, 33, 36, 37, 47, 31, 32, 34, 35, 385/48, 49, 50; 398/45, 46, 47, 48, 49, 50, 398/82, 83, 84, 85, 86, 87, 88; 370/223, 370/224, 225, 226
See application file for complete search history.

(56) References Cited

U.S. PATENT DOCUMENTS

| 4,838,637 A | 6/1989 | Torok et al. |
| 5,684,612 A | 11/1997 | Wilde et al. |

(Continued)

*Primary Examiner*—Jason Chan
*Assistant Examiner*—David S Kim
(74) *Attorney, Agent, or Firm*—Mark J. Spolyar

(57) ABSTRACT

A novel wavelength routing apparatus is disclosed, which uses a diffraction grating to separate a multi-wavelength optical signal from an input port into multiple spectral channels; a channel-interleaving assembly (e.g., an array of prisms) to interleave the spectral channels into two channel groups; and an "augmented relay system" to relay the interleaved channel groups onto two separate arrays of channel micromirrors, respectively. The channel micromirrors are individually controllable and pivotable to reflect the spectral channels into multiple output ports. As such, the inventive wavelength routing apparatus is capable of routing the spectral channels on a channel-by-channel basis and coupling any spectral channel into any one of the output ports. Further, the channel-interleaving scheme thus devised effectively "enlarges" the channel spacing and thereby allows the channel micromirrors in each array to be made considerably larger and more reliable, thereby significantly improving the channel filtering characteristics and ensuring more robust performance.

20 Claims, 13 Drawing Sheets

U.S. PATENT DOCUMENTS

| | | |
|---|---|---|
| 5,960,133 A | 9/1999 | Tomlinson |
| 6,097,859 A | 8/2000 | Solgaard et al. |
| 6,163,393 A | 12/2000 | Wu et al. |
| 6,181,849 B1 | 1/2001 | Lin et al. |
| 6,204,946 B1 | 3/2001 | Aksyuk et al. |
| 6,263,127 B1 | 7/2001 | Dragone et al. |
| 6,266,176 B1 | 7/2001 | Anderson et al. |
| 6,415,067 B1 | 7/2002 | Copner et al. |
| 6,434,291 B1 * | 8/2002 | Kessler et al. ............... 385/24 |
| 6,501,877 B1 * | 12/2002 | Weverka et al. ............. 385/31 |
| 6,636,654 B1 * | 10/2003 | McGuire, Jr. ................ 385/17 |
| 6,694,073 B1 * | 2/2004 | Golub et al. ................. 385/18 |
| 2002/0003643 A1 | 1/2002 | Qian et al. |

\* cited by examiner

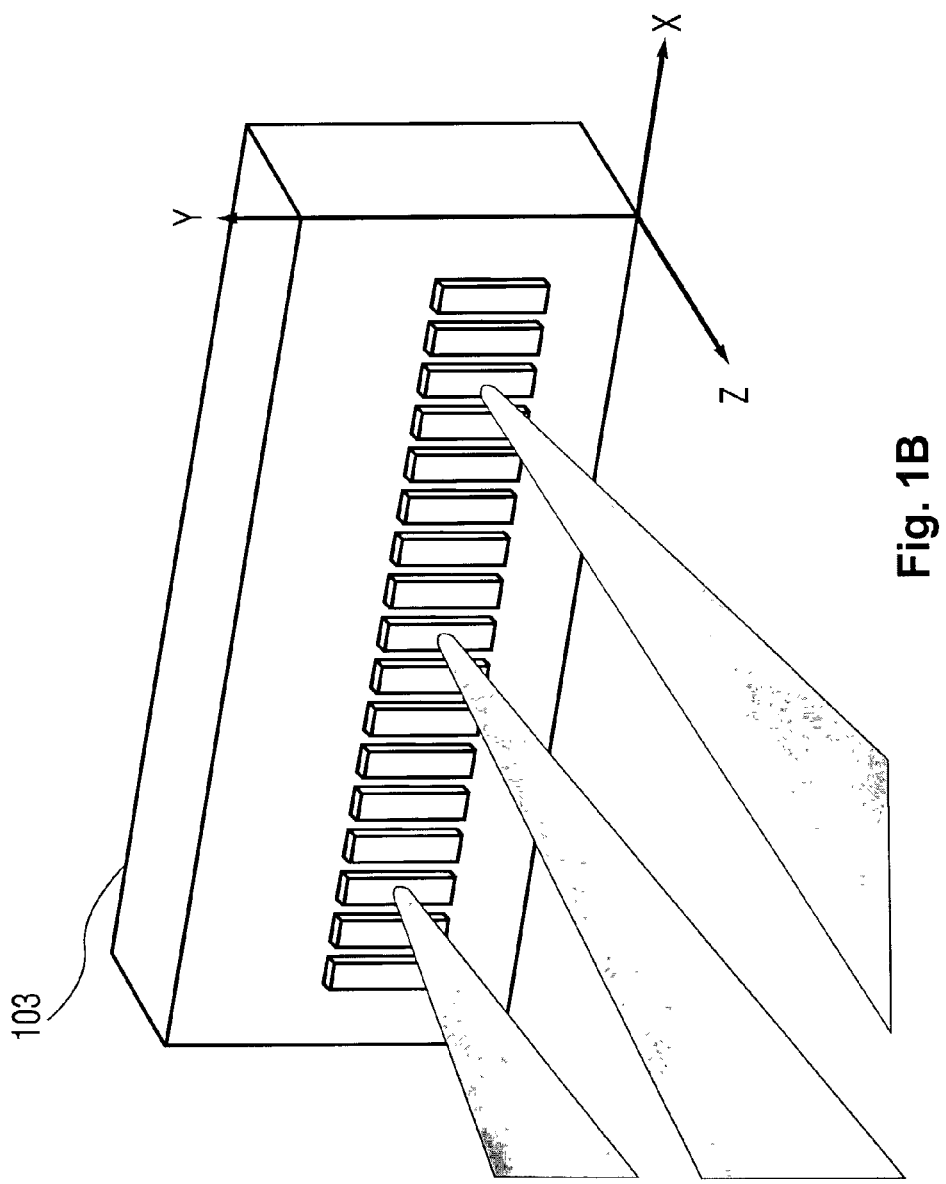

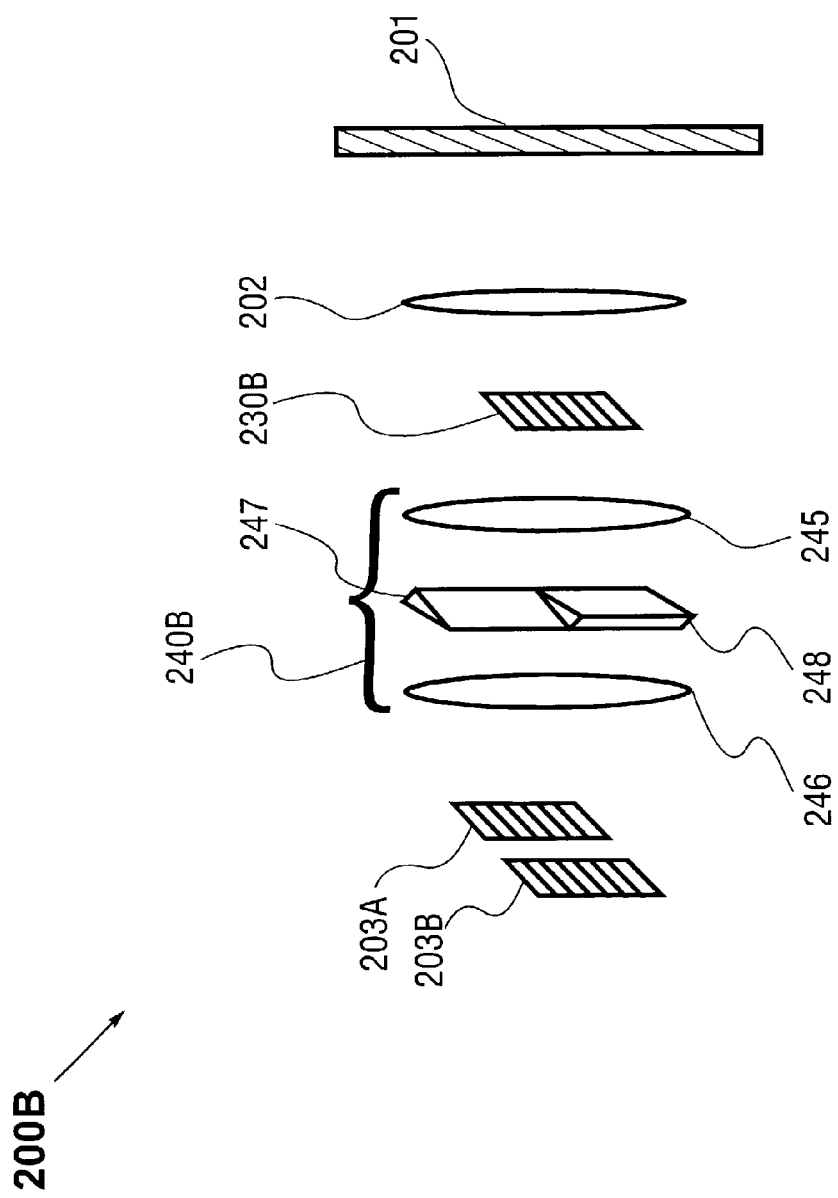

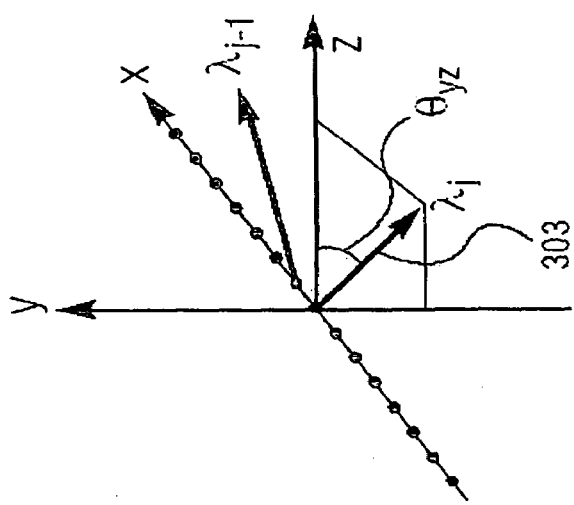
Fig. 3B
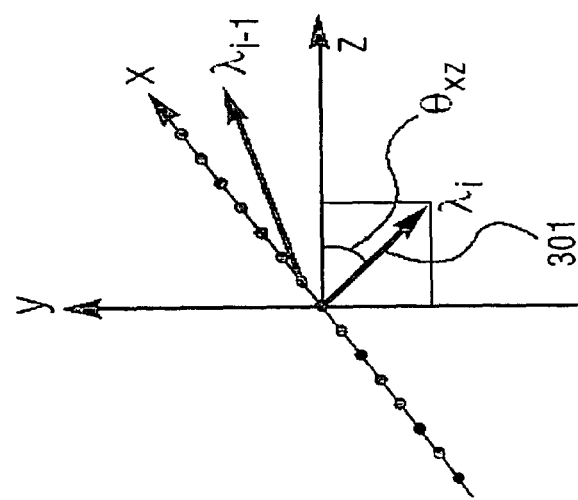
Fig. 3A

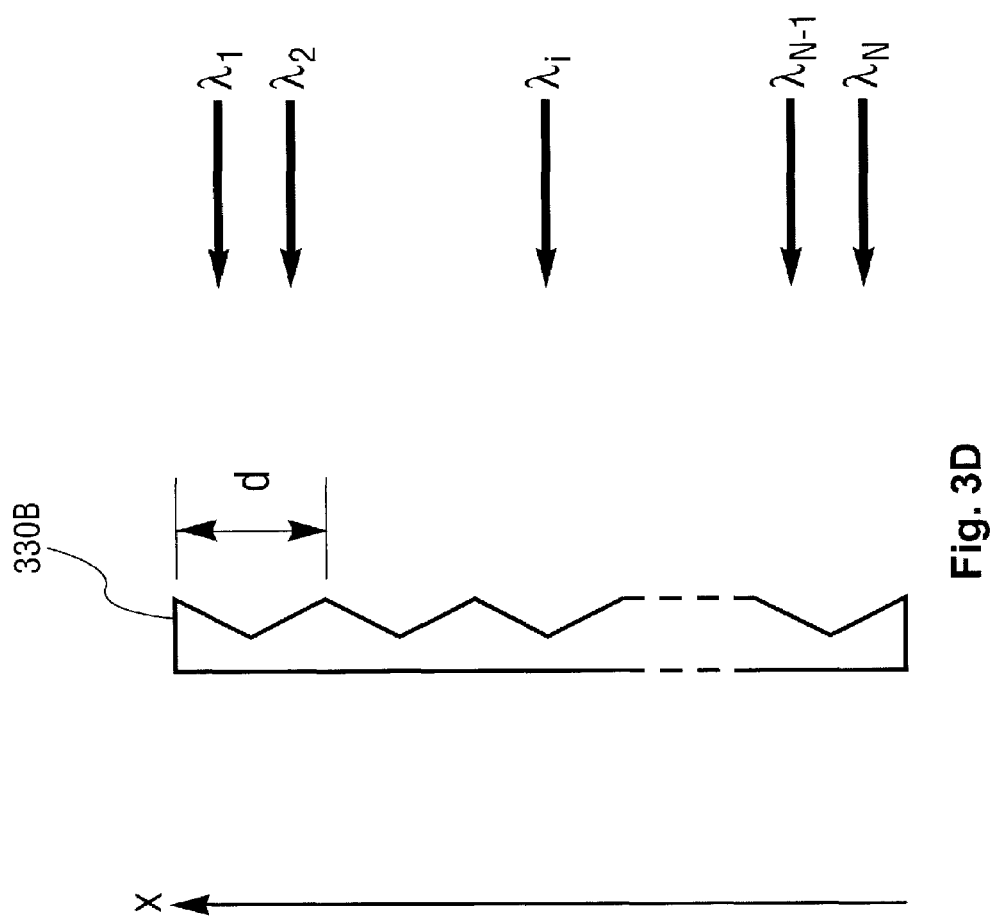

FREE-SPACE DYNAMIC WAVELENGTH ROUTING SYSTEMS WITH INTERLEAVED CHANNELS FOR ENHANCED PERFORMANCE

CROSS-REFERENCE TO RELATED APPLICATIONS

This application claims priority of U.S. Provisional Patent Application No. 60/315,626, filed on 29 Aug. 2001, and U.S. Provisional Patent Application No. 60/375,961, filed on 27 Apr. 2002, both of which are incorporated herein by reference.

FIELD OF THE INVENTION

The present invention relates generally to optical systems and, in particular, to dynamic wavelength routing systems with improved channel filtering characteristics and robust performance. Embodiments of the present invention are well suited for optical networking applications.

BACKGROUND OF THE INVENTION

In contemporary optical networking applications, an essential building block is a device that can separate a multi-wavelength optical signal into multiple spectral channels and route the individual spectral channels into multiple output ports in a dynamically reconfigurable fashion, while exhibiting desired channel filtering characteristics (e.g., flat channel transfer functions and minimal channel crosstalk). It is further desired for such a device to provide "hitless" reconfiguration (i.e., no light is to be coupled to intermediate output ports when channel switching is taking place), short reconfiguration time, and channel power control capability (e.g., the optical power levels of the spectral channels coupled into the output ports are controlled at predetermined values).

Co-pending, commonly owned now U.S. Pat. No. 6,625,346 filed on Aug. 23, 2001 and incorporated herein by reference, discloses a free-space wavelength-separating-routing (WSR) apparatus. Depicted in FIG. 1A is an exemplary embodiment 100 of this WSR apparatus, comprising multiple input/output ports which may be an array of fiber collimators 110, providing an input port 110-1 and a plurality of output ports 110-2 through 110-N (N≧3); a wavelength-separator which in one form may be a diffraction grating 101; a beam-focuser in the form of a focusing lens 102; and an array of channel micromirrors 103. The WSR apparatus 100 may further comprise an array 120 of collimator-alignment mirrors 120-1 through 120-N, e.g., in a one-to-one correspondence with the input port 110-1 and output ports 110-2 through 110-N.

In operation, a multi-wavelength optical signal emerges from the input port 110-1, which may be directed onto the diffraction grating 101 by way of the input collimator-alignment mirror 120-1. The diffraction grating 101 angularly separates the multi-wavelength optical signal into multiple spectral channels. (For purposes of illustration and clarity, only three spectral channels are explicitly shown.) The focusing lens 102 in turn focuses the dispersed spectral channels into corresponding focused spots, impinging onto the channel micromirrors 103. Each channel micromirror receives a unique one of the spectral channels. The channel micromirrors 103 are individually controllable and movable (e.g., pivotable or rotatable), such that, upon reflection, the spectral channels are directed into selected ones of the output ports 110-2 through 110-N. Each output port may receive any number of the reflected spectral channels. The output collimator-alignment mirrors 120-2 through 120-N may further provide angular control of the reflected optical beams and thereby facilitate the coupling of the spectral channels into the respective output ports. A quarter-wave plate 104 may be additionally interposed between the diffraction grating 101 and the channel micromirrors 103 to mitigate any undesirable polarization-sensitive effect.

Depicted in FIG. 1B is a close-up view of the channel micromirrors 103 shown in the embodiment of FIG. 1A. By way of example, the channel micromirrors 103 are arranged in a one-dimensional array along the x-axis (i.e., the horizontal direction in the figure), so as to receive the focused spots of the spatially separated spectral channels in a one-to-one correspondence. (As in the case of FIG. 1A, only three spectral channels are illustrated, each represented by a converging beam.) The reflective surface of each channel micromirror lies in the x-y plane as defined in the figure and is movable, e.g., pivotable (or deflectable) about the x-axis. Each spectral channel, upon reflection, is deflected in the y-direction (e.g., downward) relative to its incident direction. The beam focuser 102 of FIG. 1A in turn translates the angular deflection into a corresponding spatial displacement, whereby the spectral channel is directed into the desired output port.

Thus, a distinct feature of the above WSR apparatus is that the motion of each channel micromirror is individually and continuously controllable, such that its position (e.g., pivoting angle) can be continuously adjusted. This enables each channel micromirror to direct its corresponding spectral channel to any one of multiple output ports.

As the demand for capacity grows, the spectral channels in optical networking applications may have increasingly narrower channel separation. A case in point may be DWDM (dense wavelength-division-multiplexing) applications, where the frequency spacing between two adjacent spectral channels is typically less than 100 GHz in the wavelength range of 1.3–1.6 μm. Accordingly, the channel micromirror array 103 in the WSR apparatus 100 of FIGS. 1A–1B may have to be equipped with increasingly smaller pitch (i.e., the separation between two adjacent micromirrors), in order to accommodate such applications. As a result, it may become difficult for the WSR apparatus 100 of FIGS. 1A–1B to maintain desired channel filtering and other performance characteristics. Fabrication of such narrow-pitch micromirror arrays would also be a formidable task.

A conventional approach for dealing with spectral channels with narrow channel spacing is to interleave the input multi-wavelength signal into two (e.g., "odd" and "even") wavelength groups, prior to de-multiplexing each group into individual wavelengths (and performing subsequent routing). U.S. Pat. No. 6,181,849, for example, discloses an implementation of this approach that entails an optical interleaver operating in conjunction with two sets of wavelength multiplexing/demultiplexing units (e.g., waveguide gratings) along with switching/routing means. Ostensibly, this is an expensive and cumbersome undertaking.

In view of the foregoing, there is a need in the art for a new generation of dynamic wavelength routing devices that are particularly suitable for DWDM or other narrow-channel-spacing optical networking applications.

SUMMARY OF THE INVENTION

The present invention provides a dynamic wavelength routing apparatus that is built upon the WSR apparatus described above and further employs a novel channel-interleaving scheme, termed a "wavelength-interleaving-routing" (WIR) apparatus herein. In the inventive WIR apparatus, the spectral channels separated by the diffraction grating are focused onto a channel-interleaving assembly, where they are interleaved into at least first and second (or "odd" and "even") channel groups, prior to impinging onto first and second arrays of channel micromirrors.

In one embodiment, an "augmented relay system" may be further included in the WIR apparatus of the present invention, adapted to "relay" (or image) the first and second channel groups from the channel-interleaving assembly onto the first and second arrays of channel micromirrors, respectively. This ensures that both the channel-interleaving assembly and the channel micromirror arrays receive focused optical beams, thereby rendering important advantages of optimizing the channel transfer functions and minimizing the channel crosstalk. First and second arrays of beam-attenuating elements may be additionally disposed in close proximity to the first and second arrays of the channel micromirror arrays, respectively, serving to control the optical power levels of the first and second channel groups on an individual and dynamic basis. The first and second arrays of beam-attenuating elements may also operate to block the spectral channels that are undergoing reconfiguration, thereby facilitating "hitless" reconfiguration.

According to one embodiment of the present invention, the channel-interleaving assembly may be provided by an array of beam-deflecting elements known in the art (e.g., prism-like elements arranged in an alternating configuration or a diffraction grating), configured to interleave the spectral channels according to a desired scheme. The channel-interleaving assembly may also comprise an array of alternating transmissive and reflective elements, where the transmissive and reflective elements correspond with the first and second channel groups (or vice versa), respectively. As described above, the augmented relay system operates to relay the first and second channel groups that are interleaved in its first focal plane onto the corresponding channel micromirror arrays situated in its second focal plane, in a manner that maintains the spatial separation between the two channel groups. In this regard, an augmented relay system may be constructed by "augmenting" a conventional relay system such as an assembly of two relay lenses known in the art, e.g., by way of interposing two beam-deflecting elements (e.g., prisms) between the two relay lenses, or by segmenting one (or each) of the relay lenses.

The channel-interleaving scheme described above allows the channel micromirrors in the first or second array to be made considerably larger than the channel micromirrors in a non-interleaved system, e.g., nearly twice as large as in the embodiment of FIGS. 1A–1B. Use of such "enlarged" channel micromirrors brings about distinct advantages of substantially flattening the channel transfer functions and minimizing the channel crosstalk. Furthermore, the larger (effective) channel spacing thus resulting allows the constituent channel micromirrors to be configured with more desirable characteristics, including (but not limited to) higher resonance frequencies, 2-D pivoting about both x and y axes, and larger pivoting angles. Such attributes would be desired in many applications. Additionally, use of larger channel micromirrors effectively renders slight misalignments between the spectral channels and the corresponding channel micromirrors practically inconsequential, thereby relaxing tolerance requirements and further rendering the system less susceptible to environmental effects (such as thermal and mechanical disturbances).

The novel features of this invention, as well as the invention itself, will be best understood from the following drawings and detailed description.

BRIEF DESCRIPTION OF THE FIGURES

FIGS. 1A–1B shows an exemplary embodiment of a wavelength-separating-routing (WSR) apparatus;

FIG. 2C shows a second embodiment of how the WIR apparatus of FIG. 2A may be implemented, according to the present invention;

FIGS. 3A–3B depict two exemplary embodiments of a channel-interleaving scheme, according to the present invention;

FIGS. 3C–3D show two exemplary embodiments of a channel-interleaving assembly, according to the present invention;

DETAILED DESCRIPTION OF EMBODIMENTS

Figure 1A:
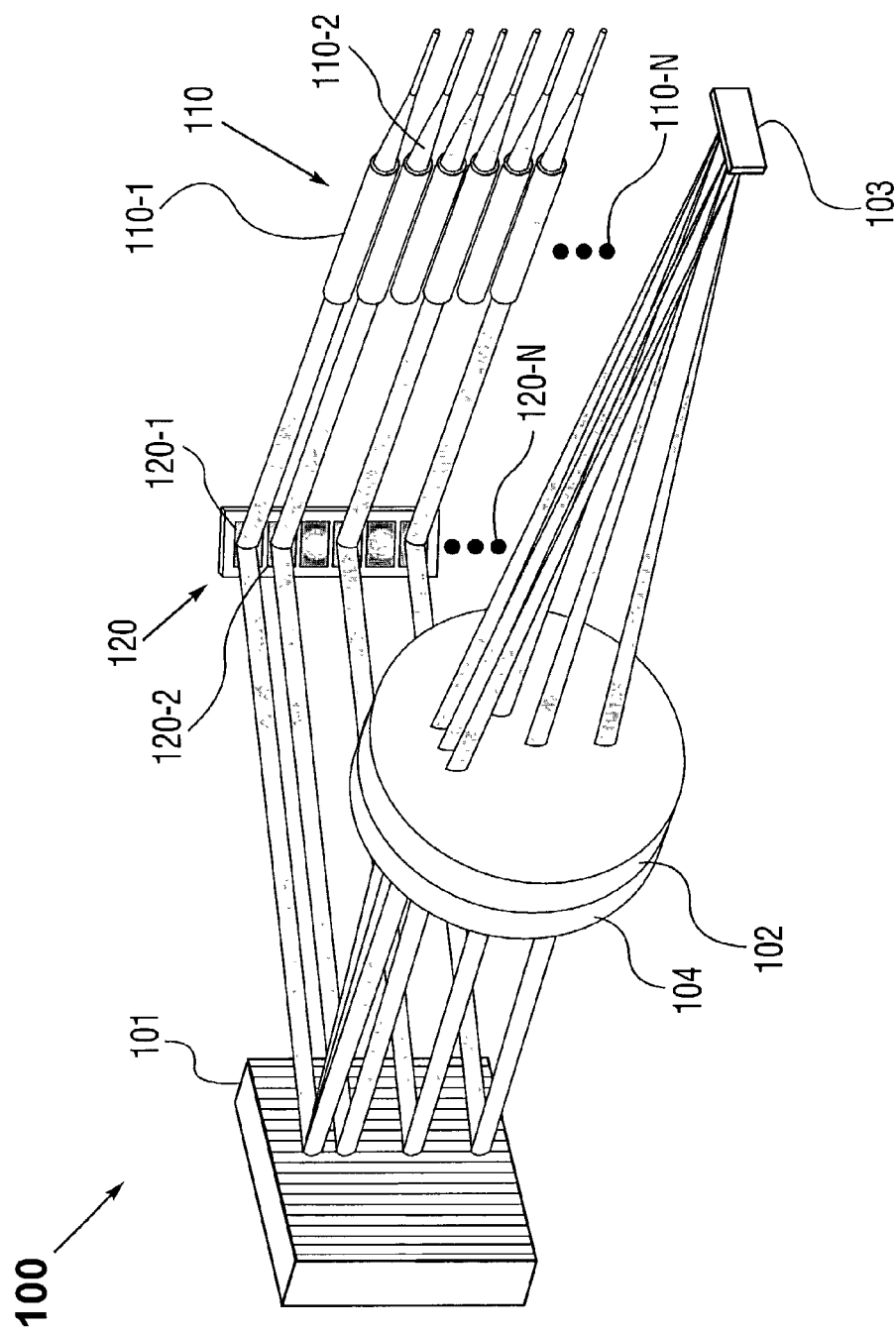
Figure 2A:
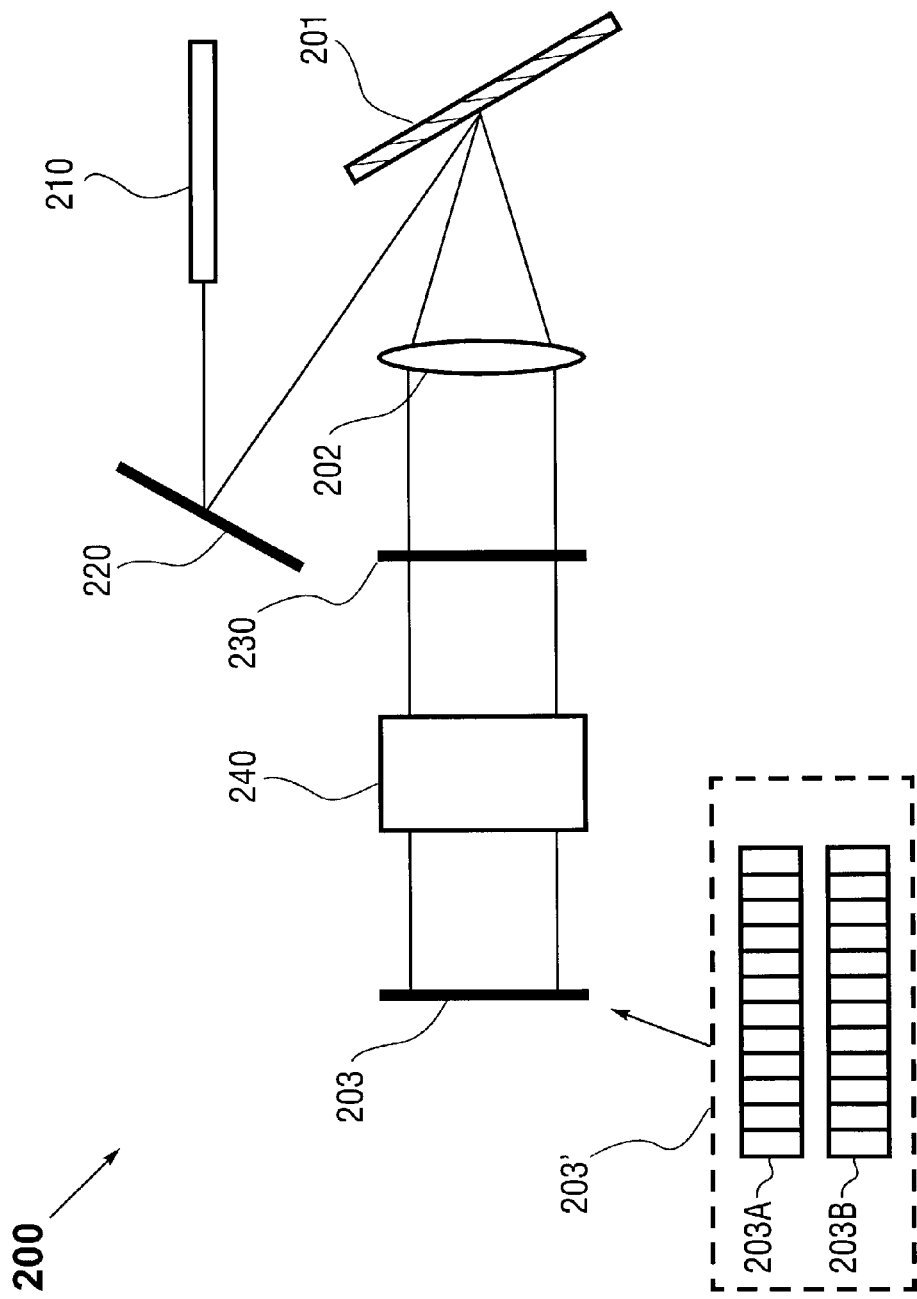
FIG. 2A depicts an exemplary embodiment of a wavelength routing apparatus employing a channel-interleaving scheme, termed a "wavelength-interleavingrouting" (WIR) apparatus herein, according to the present invention.

FIG. 2A depicts an exemplary embodiment of a wavelength routing apparatus employing a novel channel-interleaving scheme, termed a "wavelength-interleaving-routing" (WIR) apparatus herein, as a way of example to illustrate the general principles of the present invention. WIR apparatus 200 of FIG. 2A may make use of the general architecture of the WSR apparatus 100 of FIG. 1A, and is illustrated in a schematic top view with respect to the perspective view of FIG. 1A. By way of example, the WIR apparatus 200 may comprise an input-output-port array 210 which may be an array of fiber collimators providing an input port and a plurality of output ports; an array of collimator-alignment mirrors 220 which may be in a one-to-one correspondence with the input-output-port array 210; a wavelength-separator 201 which may be a diffraction grating; a beam-focuser 202 which may one or more focusing lenses (only one lens is explicitly shown for clarity); a channel-interleaving assembly 230; an "augmented relay system" 240; and a channel micromirror assembly 203 which may include first and second arrays 203A, 203B of channel micromirrors. Dashed box 203' further provides a schematic front view of the first and second channel micromirror arrays 203A, 203B.

In FIG. 2A, the input-output-port array 210, along with the collimator-alignment mirror array 220, may be configured in a manner substantially similar to that described in FIG. 1A with respect to the fiber collimators 110 and the collimator-alignment mirror array 120. Each of the channel micromirror arrays 203A, 203B may also be substantially similar to the channel micromirror array 103 of FIGS. 1A–1B in operation and overall configuration. Hence, the embodiment of FIGS. 1A–1B may be relied upon in the ensuing description that refers to these elements. Further, it should be appreciated that various lines drawn in FIG. 2A and the following figures are intended to merely illustrate the propagation of optical beams in the respective systems and therefore, are not drawn to scale. Similarly, various optical elements in these figures are shown for illustrative purposes and are not drawn to scale.

The principal operation of the WIR apparatus 200 of FIG. 2A may be as follows. A multi-wavelength optical signal emerges from the input port of the input-output-port array 210, which may be directed onto the diffraction grating 201 by way of the input collimator-alignment mirror in the collimator-alignment mirror array 220. The diffraction grating 201 angularly separates the multi-wavelength optical signal by wavelength into multiple spectral channels (where the "wavelength-separation direction" lies substantially in the plane of illustration). The beam-focuser 202 in turn focuses the dispersed spectral channels into corresponding focused spots, impinging onto the channel-interleaving assembly 230. The channel-interleaving assembly 230 may operate to interleave the impinging spectral channels into first and second channel groups, containing the "odd" and "even" spectral channels, respectively. As a way of example, the first channel group may be deflected out of and the second channel group deflected into the plane of illustration. The first and second channel groups may be subsequently "relayed" (or imaged) onto the first and second channel micromirror arrays 203A, 203B by the augmented relay system 240. Each channel micromirror corresponds with a unique one of the spectral channels. As in the embodiment of FIGS. 1A–1B, the channel micromirrors are individually controllable and movable (e.g., pivotable), such that, upon reflection, the spectral channels are directed into selected output ports in the input-output-port array 210 (where the "port-separation direction" is substantially perpendicular to the plane of illustration). The output collimator-alignment mirrors in the collimator-alignment mirror array 220 may further provide angular control of the reflected optical beams and thereby facilitate the coupling of the spectral channels into the respective output ports.

In the WIR apparatus 200 of FIG. 2A, the channel-interleaving assembly 230 may be situated in the object plane of the augmented relay system 240, which also coincides with the back focal plane of the beam-focuser 202. (The diffraction grating 201 may be placed in the front focal plane of the beam-focuser 202.) The channel micromirror assembly 203 may be situated in the image plane of the augmented relay system 240. Further, the augmented relay system 240 is adapted to relay the first and second channel groups onto their respective channel micromirror arrays, in a manner that maintains their spatial separation between the first and second focal planes. As a result, both the channel-interleaving assembly 230 and the channel micromirror assembly 203 receive focused optical beams. This provides important advantages of optimizing the channel transfer functions and minimizing the channel crosstalk. The following description sets forth a few exemplary embodiments of the channel-interleaving assembly 230 and the augmented relay system 240.

Figure 2B:
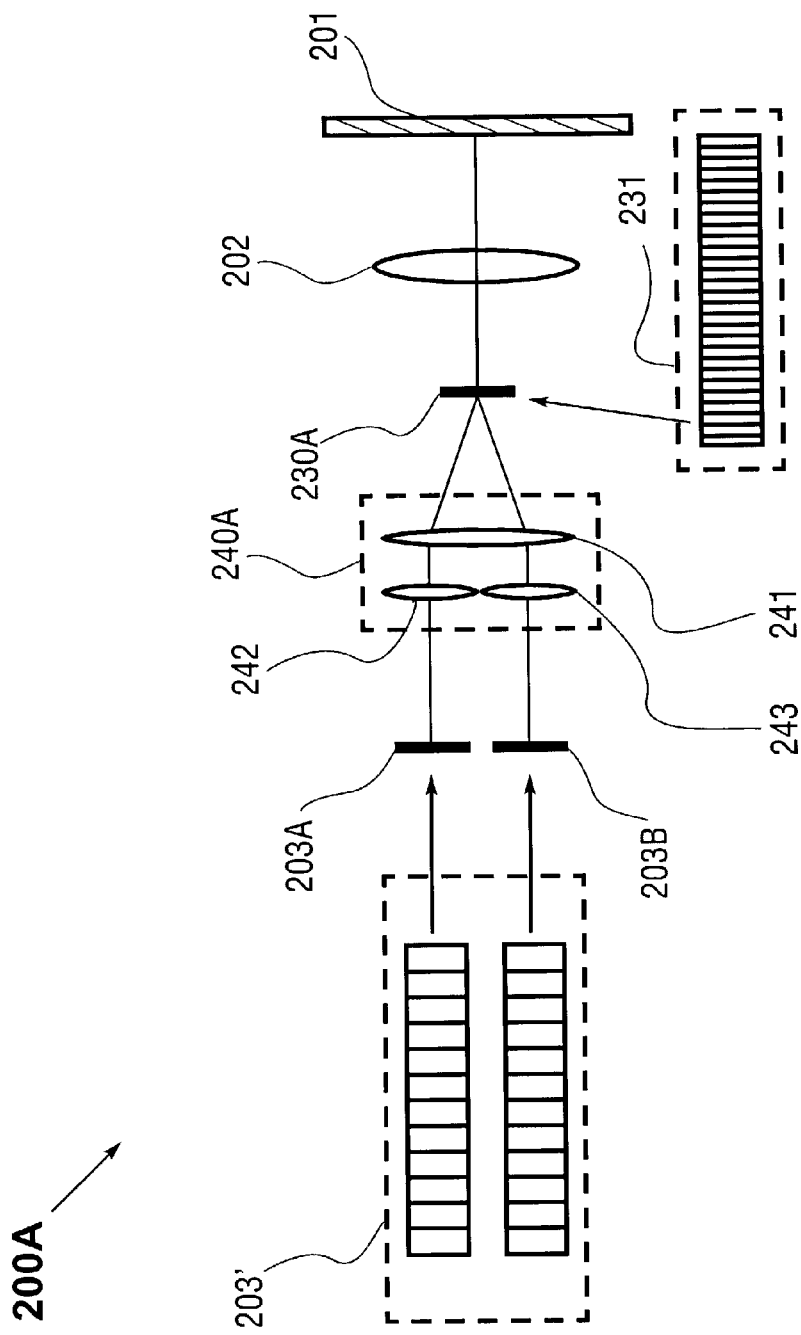
FIG. 2B shows a first embodiment of how the WIR apparatus of FIG. 2A may be implemented, according to the present invention.

FIG. 2B shows a first embodiment 200A of how the WIR apparatus 200 of FIG. 2A may be implemented, in a schematic side view with respect to the top view of FIG. 2A. Like elements are labeled by identical numerals in FIGS. 2A and 2B. For purposes of illustration and clarity, the input-output-port array 210 along with the collimator-alignment mirror array 220 of FIG. 2A are not explicitly shown in FIG. 2B (such is also the case in FIGS. 2C–2D below). The wavelength-separation direction is substantially perpendicular to the plane of illustration of FIG. 2B.

In the embodiment of FIG. 2B, the channel-interleaving assembly 230A may be provided by a "prism mask" which may comprise an array of prism-like elements, arranged in an alternating fashion. Dashed box 231 provides a schematic front view of the prism mask 230A, as a way of example. The prism mask 230A may be configured to deflect the "odd" spectral channels upward and to deflect the "even" spectral channels downward (or vice versa) in the plane of illustration of FIG. 2B. This results in a channel-interleaving direction that is substantially perpendicular to the wavelength-separation direction. The augmented relay system 240A may be in the form of a first relay lens 241 in conjunction with second (or "top") and third (or "bottom") relay lenses 242, 243, where the top and bottom relay lenses 242, 243 may be substantially identical. (It will be appreciated that the top and bottom relay lenses 242, 243 may alternatively be provided by a segmented lens.) In this manner, the first and second channel groups are re-focused by the top and bottom relay lenses 242, 243 at spatially separate locations, e.g., impinging upon the first and second channel micromirror arrays 203A, 203B, respectively.

The first and second channel micromirror arrays 203A, 203B may operate to reflect the first and second channel groups back onto the top and bottom relay lenses 242, 243, respectively. The augmented relay system 240 in turn directs the reflected spectral channels onto their corresponding prism elements (as on the forward path) in the channel-interleaving assembly 230A. In this manner, the channel-interleaving assembly 230A may effectively "undo" what it imparted to the spectral channels on the forward path, whereby upon emerging from the beam-focuser 202, the reflected spectral channels return to the diffraction grating 201 in substantially the same way (in the wavelength-separation direction) as they were diffracted from the grating 201 on the forward path. Albeit, the spectral channels on the return path are displaced in the port-separation direction in order to be coupled into different output ports, as described above with respect to FIGS. 1A–1B. In other words, other than being displaced in the port-separation direction, the spectral channels on the return path may substantially "retrace" their respective paths between the channel micromirror assembly 203 and the diffraction grating 201, insofar as the wavelength-separation direction is concerned. This allows the diffraction grating 201 to effectively "cancel" the dispersion it inflicted onto the spectral channels on the forward path and multiplex the spectral channels in accordance with their destination output ports, thereby ensuring an optimal coupling of the spectral channels into the respective output ports and minimizing the insertion loss of the system.

FIG. 2C shows a second embodiment 200B of how the WIR 200 of FIG. 2A may be implemented, in a perspective top view with respect to FIG. 2A. Like elements are labeled by identical numerals in FIGS. 2A and 2C. As in the case of FIG. 2A, the wavelength-separation direction lies substantially in the plane of illustration of FIG. 2C. In this embodiment, the channel-interleaving assembly 230B may also be provided by a prism mask comprising an array of prisms. As a way of example, the prism mask 230B may be configured to cause that the "odd" and "even" spectral channels to be interleaved in a direction substantially along the wavelength-separation direction. The augmented relay system 240B may comprise a "bi-prism" in the form of first (or "top") and second (or "bottom") prisms 247, 248, interposed between first and second relay lenses 245, 246. The prism mask 230B may direct the first and second channel groups respectively onto the first and second prisms 247, 248, for instance. Furthermore, the first and second prisms 247, 248 in conjunction with first and second relay lenses 245, 246 may be adapted to cause the first and second channel groups to be further displaced in a direction substantially perpendicular to the wavelength-separation direction, e.g., with the first channel group directed into and the second channel group out of the plane of illustration (or vice versa). In this manner, the first and second channel groups impinge onto the first and second channel micromirror arrays 203A, 203B, respectively.

In the embodiment of FIG. 2C, it is desirable for the first and second channel micromirror arrays 203A, 203B to be configured such that upon reflection, the first and second channel groups are directed back onto the first and second prisms 247, 248, respectively. This enables the reflected spectral channels to substantially "re-trace" their respective paths and approach the diffraction grating 201 in substantially the same way (in the wavelength-separation direction) as they were diffracted from the grating 201 on the forward path, such as in the case of FIG. 2B. To accomplish such, the channel micromirrors may each be movable bi-axially (e.g., pivotable about two orthogonal axes). Alternatively, the channel micromirrors may each be pivotable uni-axially—but additionally tilted at a predetermined ("bias") angle, effective to force the reflected spectral channels to substantially re-trace their respective paths on the return path.

It will be appreciated that by interleaving the spectral channels along the wavelength-separation direction (such as in the embodiment of FIG. 2C), the relay lenses (e.g., the first and second relay lenses 245, 246) in the corresponding augmented relay system need not be as large (e.g., as the first relay lens 241 in the embodiment of FIG. 2B). Further, because the first and second channel micromirror arrays each contain multiple channel micromirrors (corresponding with multiple spectral channels in each channel group), it would be advantageous to displace the channel micromirror arrays in a direction substantially perpendicular to the wavelength-separation direction. The prism mask 230B and the augmented relay system 240B of FIG. 2C are devised to achieve such objectives. It will be further appreciated that the first and second prisms 247, 248 in the augmented relay system 240B of FIG. 2C may be substituted by other types of beam-deflecting elements known in the art, so long as the alternative elements are configured to perform in a substantially equivalent way.

Figure 2D:
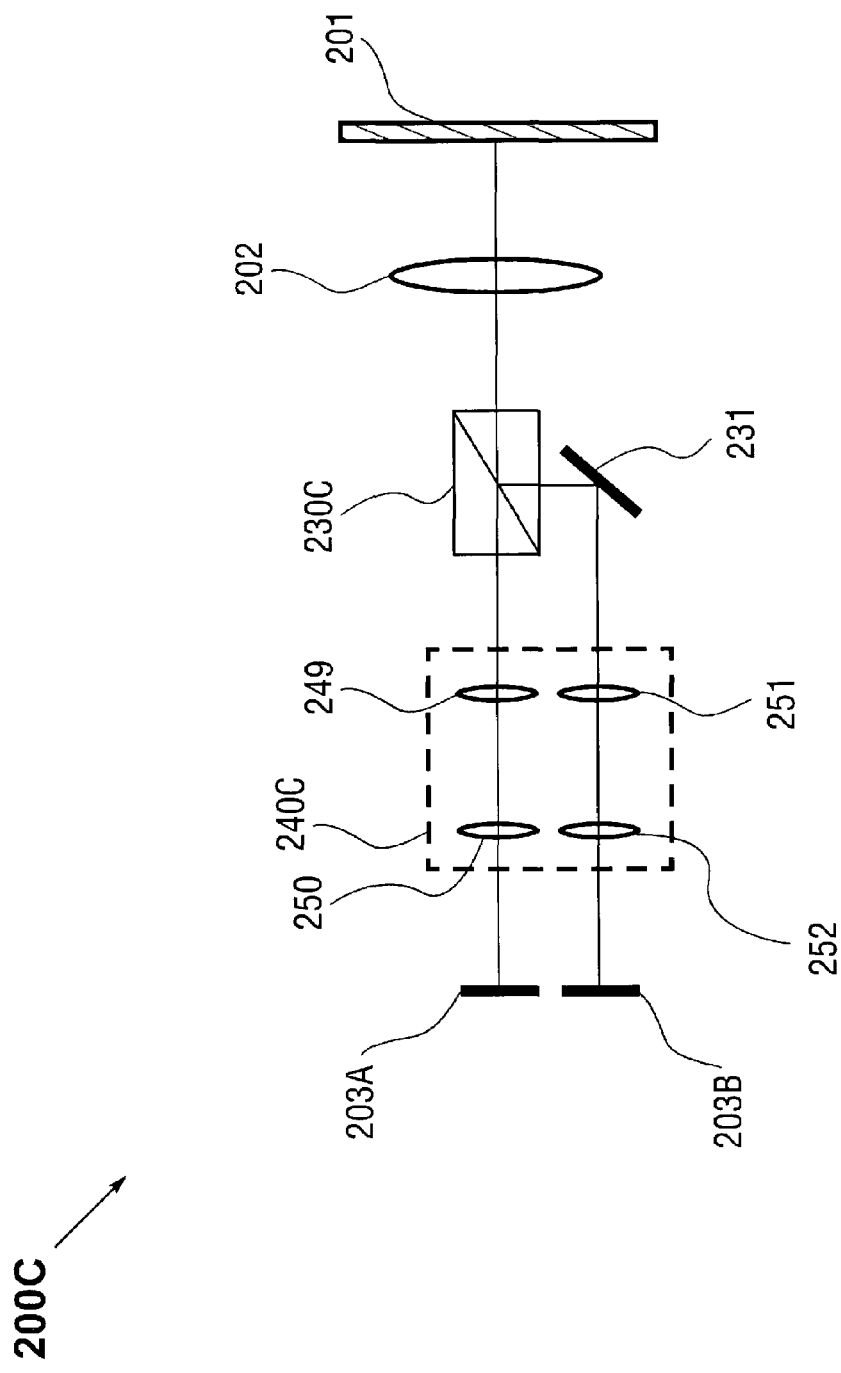
FIG. 2D depicts a third embodiment of how the WIR apparatus of FIG. 2A may be implemented, according to the present invention.

FIG. 2D shows a third embodiment 200C of how the WIR 200 of FIG. 2A may be implemented, in a schematic side view with respect to the top view of FIG. 2A. Like elements are labeled by identical numerals in FIGS. 2A and 2D. As in the case of FIG. 2B, the wavelength-separation direction is substantially perpendicular to the plane of illustration. In this embodiment, the channel-interleaving assembly 230C may comprise an array of alternating transmissive and reflective elements, e.g., adapted to let the "odd" spectral channels pass though and to reflect the "even" spectral channels. The channel-interleaving assembly 230C may further include a beam-reflector 231 (e.g., a mirror), for re-directing the "even" spectral channels so that the first and second channel groups subsequently propagate in parallel. In this manner, the resulting channel-interleaving direction is substantially perpendicular to the wavelength-separation direction, as in the case of FIG. 2B.

In FIG. 2D, the augmented relay system 240C may be in the form of first, second, third, and fourth relay lenses 249, 250, 251, 252. (It will be appreciated that the first and third 249, 251, or the second and fourth relay lenses 250, 252, may alternatively be provided by a segmented lens.) The first and second relay lenses 249, 250 effectively constitute a "conventional" relay system (e.g., an assembly of two relay lenses as known in the art), serving to relay the first channel group onto the first channel micromirror array 203A. Likewise, the third and fourth relay lenses 251, 252 effectively constitute another "conventional" relay system, operating to relay the second channel group onto the second channel micromirror array 203B. On the return path, the reflected spectral channels substantially "re-trace" their respective optical paths through the intervening optics, and return to the diffraction grating 201 in substantially the same way (in the wavelength-separating direction) as they were diffracted from the grating 201 on the forward path, thereby minimizing the insertion loss. (It will be appreciated that the beam-reflector 231 need not be in the embodiment of FIG. 2D. If such is desired in a given application, those skilled in the art will know how to arrange the augmented relay system 240C along with the first and second channel micromirror arrays 203A, 203B, accordingly.)

As described above, an "augmented relay system" in the present invention is adapted to relay (or image) the first and second channel groups that are interleaved in its object plane onto two separate channel micromirror arrays situated in its image plane, in a manner that maintains the spatial separation between the two channel groups. In this regard, an augmented relay system may be constructed by "augmenting" a conventional relay system such as an assembly of two relay lenses, e.g., by way of interposing two (transmissive and/or reflective) beam-deflecting elements between the two relay lenses, or by way of segmenting one (or each) of the relay lenses into two, such as described above with respect to FIG. 2B, 2C, or 2D. It will be appreciated that the augmented relay systems 240A, 240B, 240C above provide only a few of many embodiments of an augmented relay system according to the present invention. All in all, from the teachings of the present invention, those skilled in the art will know how to implement an appropriate augmented relay system, to best suit a given application.

FIGS. 3A–3B depict two exemplary embodiments illustrating how the channel interleaving may take place at a channel-separation assembly, according to the present invention. In FIG. 3A, the wavelength separation may take place substantially along the x-axis. The channel interleaving may be such that the chief ray deflection is substantially perpendicular to the x-axis and thereby resides in planes parallel to the y-z plane. As a way of example, arrowed line 301 may represent a chief ray associated with a spectral channel $\lambda_i$, where angle $\theta_{xz}$ indicates the angular deflection of the chief ray 301 with respect to the x-z plane. The embodiments of FIGS. 2B and 2D pertain to this configuration. In FIG. 3B, the wavelength separation likewise takes place substantially along the x-axis, whereas the channel interleaving may be such that the chief ray deflection is substantially parallel to the x-axis and therefore resides in the x-z plane. By way of example, arrowed line 303 may represent a chief ray associated with a spectral channels $\lambda_j$, where angle $\theta_{yz}$ indicates the angular deflection of the chief ray 303 with respect to the y-z plane (or any plane parallel to the y-z plane). The embodiment of FIG. 2C pertains to this configuration.

Figure 3C:
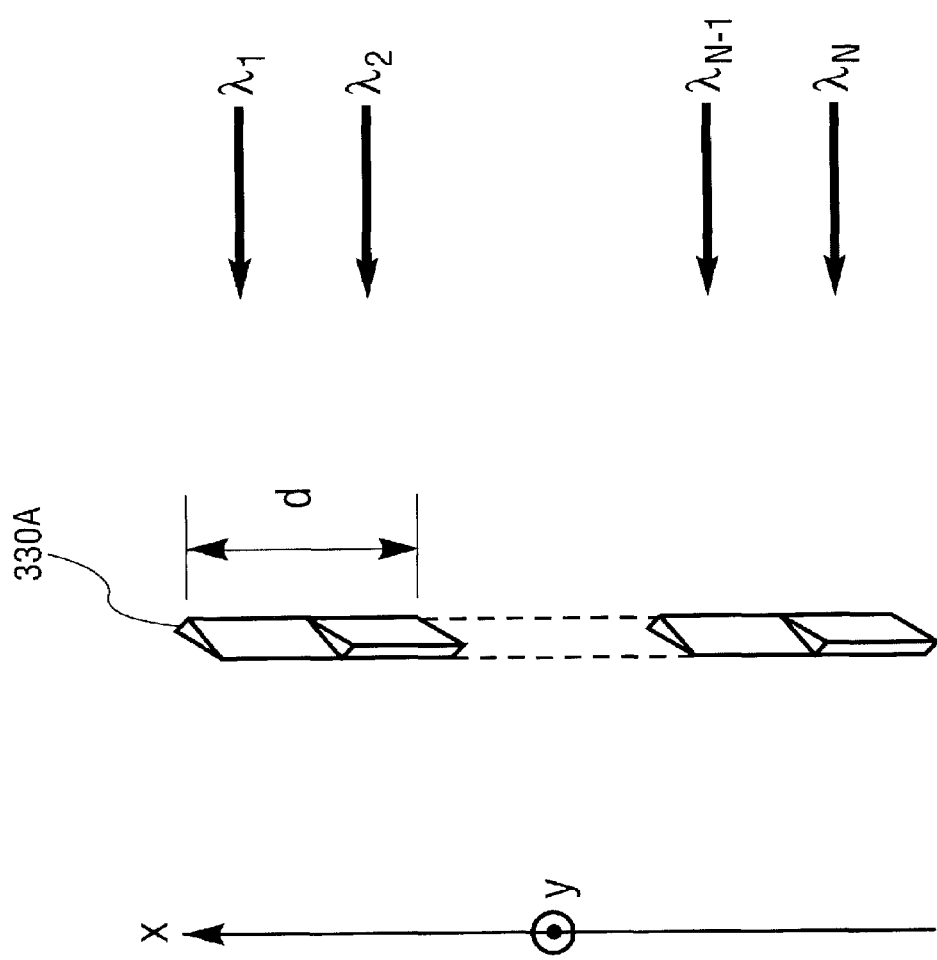

FIG. 3C depicts a schematic side view of a prism mask 330A formed by an array of prism elements, which may be adapted to effect the channel interleaving in a manner as described above with respect to FIG. 3A. The prism mask 330A is configured such that there is one-to-one correspondence between the constituent elements and the impinging spectral channels, so as to impart a predetermined deflection to each spectral channel. As a way of example, the constituent prism elements of the prism mask 330A may be arranged in an alternating fashion, as shown in FIG. 3C, such that the "odd" spectral channels are deflected out of and the "even" spectral channels deflected into the plane of illustration (or vice versa). This renders the channel-interleaving direction (e.g., along the y-axis that is pointing out of the plane of illustration) substantially perpendicular to the wavelength-separation direction (e.g., along the x-axis), such as described above with respect to FIG. 3A. The prism mask 330A may be used to embody the channel-interleaving assembly 230A of FIG. 2B, for instance. It will be appreciated that the prism mask 330A may alternatively comprise other types of prisms or beam-deflecting elements known in the art, as long as the constituent elements are configured to interleave the spectral channels in a substantially equivalent manner.

FIG. 3D depicts a schematic side view of a prism mask 330B formed by an array of prism-like elements, which may be adapted to effect the channel interleaving in a manner as described above with respect to FIG. 3B. The constituent elements of the prism mask 330B may likewise be in a one-to-one correspondence with the impinging spectral channels, as shown in the figure. In this embodiment, the prism mask 330B may be configured to cause the "odd" spectral channels to be deflected in the positive x direction, while the "even" spectral channels deflected in the negative x direction (or vice versa) in the plane of illustration. This renders the channel-interleaving direction substantially along the wavelength-separation direction (e.g., along the x-axis), e.g., in a manner as described above with respect to FIG. 3B. As such, the prism mask 330B may be used to embody the channel-interleaving assembly 230B of FIG. 2C, for example.

The prism mask 330B may be conveniently provided by a transparent grating (e.g., made of glass or silicon) known in the art, whose "groove period" d is twice the separation between two adjacent spectral channels in the back focal plane of the beam-focuser 202 (not explicitly shown in FIG. 3D). It may alternatively comprise arrayed refracting prisms, holographic prisms, or other types of beam-deflecting elements known in the art, so long as the constituent elements are configured to interleave the spectral channels in a substantially equivalent manner.

In general, a channel-interleaving assembly according to the present invention may refer to any means that is capable of separating a plurality of spectral channels into at least two channel groups that are spatially displaced, e.g., in a manner described above with respect to the embodiment of FIG. 3A or 3B. Although the forgoing embodiments refer to situations where multiple spectral (or wavelength) channels are separated into first and second (or "odd" and "even") channel groups, those skilled in the art will appreciate that the principles of the present invention may also be extended to applications where it is desirable to separate the spectral channels into more than two channel groups, which may provide a further enlarged channel spacing in each channel group, for instance. This may be accomplished by implementing an appropriate "channel-separating" assembly (e.g., a prism mask which is capable of causing every M (M<N) spectral channels to be deflected in M different directions), in conjunction with a corresponding augmented relay system (e.g., a large relay lens followed by M separate relay lenses configured in a manner similar to the augmented relay system 240 FIG. 2B) in the embodiment of FIG. 2A. Alternatively, a plurality of channel-interleaving assemblies (along with corresponding augmented relay systems) as described above may be cascaded in FIG. 2A, thereby resulting in multiple channel groups each equipped with a larger channel spacing. From the teachings of the present invention, those skilled in the art will also know how to devise an appropriate channel separating scheme in a wavelength routing apparatus of the present invention, to best suit a given application.

Figure 4:
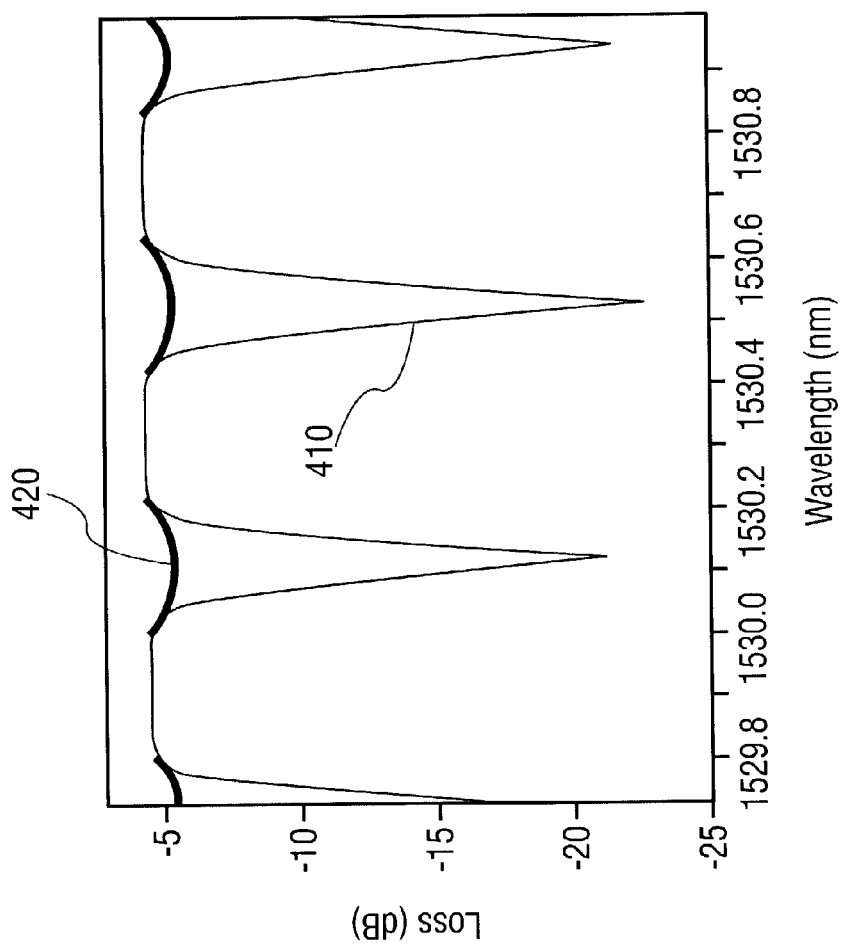
FIG. 4 displays two exemplary plots of channel transfer functions, characteristic of the WSR apparatus of FIG. 1A and the WIR apparatus of FIG. 2A.

Those skilled in the art will appreciate that the channel-interleaving scheme described above allows the channel micromirrors in either of the first and second arrays 203A, 203B to be made considerably larger (e.g., nearly twice as large as in the embodiment of FIGS. 1A–1B). Use of such "enlarged" channel micromirrors brings about distinct advantages of substantially flattening the channel transfer functions and minimizing the channel crosstalk. As a way of example, FIG. 4 illustrates two exemplary plots of channel transfer functions. First plot 410 shows three exemplary channel transfer functions characterized by sizable inter-channel "notches" which may be characteristic of the WSR apparatus of FIG. 1A. In contrast, the channel transfer functions displayed by second plot 420 exhibit starkly shallower inter-channel "notches" which may be characteristic of the WIR apparatus of FIG. 2A. (Note that the shallow inter-channel "notches" shown in the second plot 420 may result from sharp delineation between adjacent elements in the channel-separation assembly employed). Such nearly "notch-less" channel transfer functions may be desired in some applications. Furthermore, the larger (effective) channel spacing thus resulting may allow the constituent channel micromirrors to be configured with more desirable characteristics, including (but not limited to) higher resonance frequencies, biaxial rotation about two orthogonal axes, and larger pivoting angles. Such attributes would be desirable in many applications. For example, biaxial rotation capability offers the possibility of implementing "hitless" reconfiguration by first steering a wavelength away from the line of output collimators, then steering the wavelength up or down in a direction parallel to the collimator array to a position adjacent to the desired output port location, and lastly steering the wavelength back onto the collimator array so as to couple the wavelength channel light into the appropriate output fiber.

Figure 5:
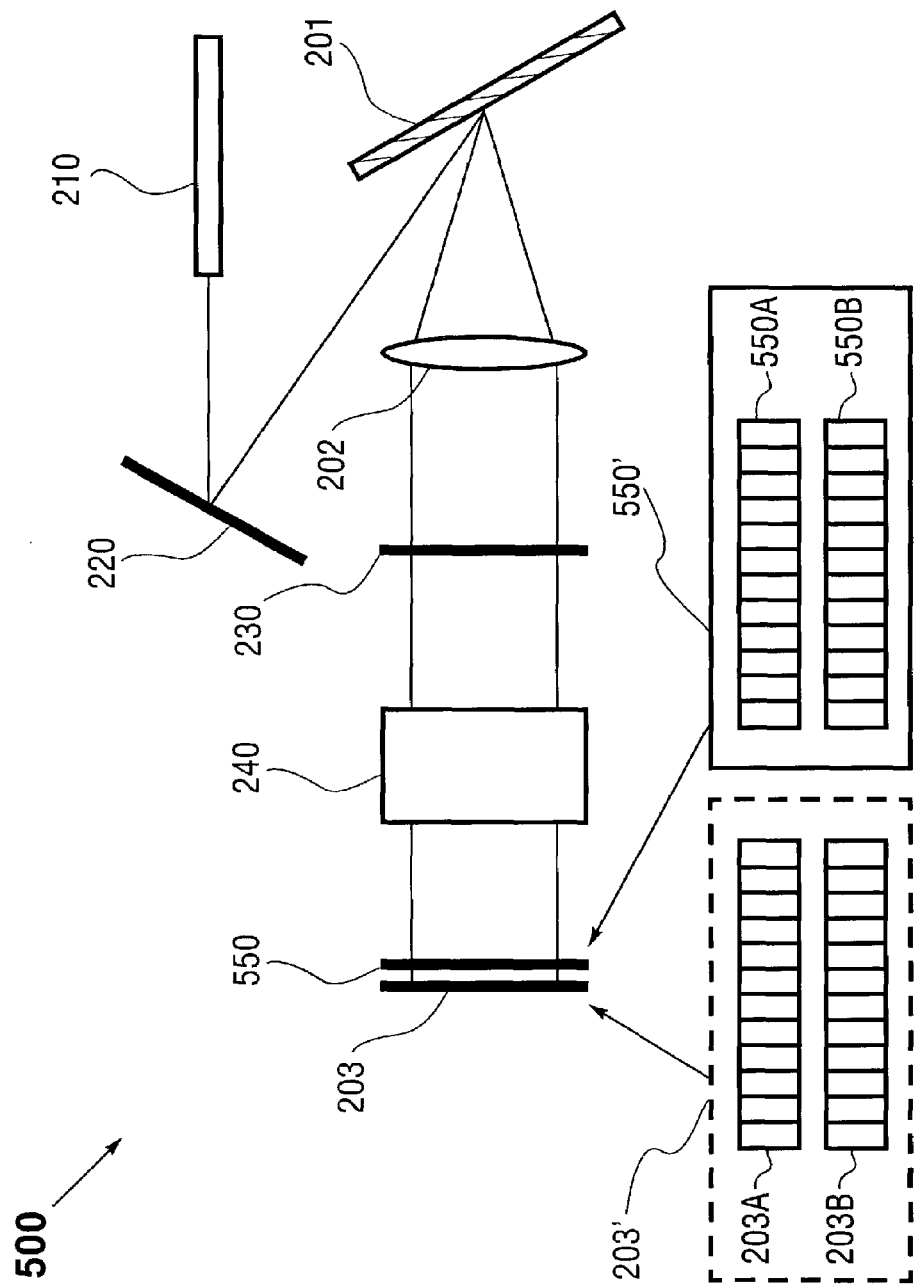
FIG. 5 depicts an exemplary embodiment of a WIR apparatus having channel power control capability, according to the present invention.

In applications where it is desired to dynamically manage the optical power levels of the spectral channels coupled into the output ports, a beam-attenuating assembly may be further implemented in a WIR apparatus of the present invention, as shown in FIG. 5. By way of example, WIR apparatus 500 of FIG. 5 may make use of the general architecture of and a number of elements used in the embodiment of FIG. 2A, as indicated by those elements labeled by identical numerals. In addition, a beam-attenuating assembly 550 may be disposed between the augmented relay system 240 and the channel micromirror assembly 203, e.g., in close proximity to the channel micromirror assembly 203. The beam-attenuating assembly 550 may comprise first and second arrays 550A, 550B of beam-attenuating elements which may be liquid-crystal based variable optical attenuators (termed "LC-pixels" herein) known in the art. Dashed box 550' further provides a schematic front view of the first and second beam-attenuating arrays 550A, 550B, respectively. In this manner, the first and second channels groups are incident upon and therefore manipulated by the first and second beam-attenuating arrays 550A, 550B, prior to impinging onto the first and second channel micromirror arrays 203A, 203B (on the forward path), respectively.

In the embodiment of FIG. 5, the first and second beam-attenuating arrays 550A, 550B may operate to attenuate the corresponding spectral channels on an individual and dynamic basis, so as to control the optical power levels of the spectral channels coupled into the output ports at desired values (e.g., equalized at a predetermined value). The first and second beam-attenuating arrays 550A, 550B may further serve to "block" the spectral channels that are undergoing reconfiguration, thereby facilitating "hitless" reconfiguration. Such channel power control and hitless reconfiguration capabilities would be highly desirable in optical networking applications. Moreover, because the constituent LC-pixels in the first and second beam-attenuating arrays 550A, 550B may likewise be made considerably larger, as a result of the aforementioned channel-interleaving scheme, the arrangement between the channel micromirror assembly 203 and the beam-attenuating assembly 550 in FIG. 5 would not adversely affect the channel filtering characteristics.

Those skilled in the art will appreciate that the beam-attenuating assembly 550 may alternatively comprise MEMS based shuttering/attenuation elements, or other types of electro-optic shuttering/attenuation elements known in the art, in lieu of the LC-pixels. Moreover, the functionalities of the channel-interleaving assembly 230 and the beam-attenuating assembly may also be combined by depositing liquid crystal material (along with associated control circuitry) onto the channel-interleaving assembly 230 (e.g., the prism mask of FIG. 3C or 3D). From the teachings of the present invention, one skilled in the art will know how to devise a suitable beam attenuating/shuttering means in a WIR apparatus of the present invention, for a given application.

It will be further appreciated that the use of larger channel micromirrors (along with larger LC-pixels) as described above effectively renders any slight misalignment between the spectral channels and the corresponding channel micromirrors (or the LC-pixels) practically inconsequential, thereby relaxing tolerance requirements and further rendering the system less susceptible to environmental effects (such as thermal and mechanical disturbances).

Figure 6A:
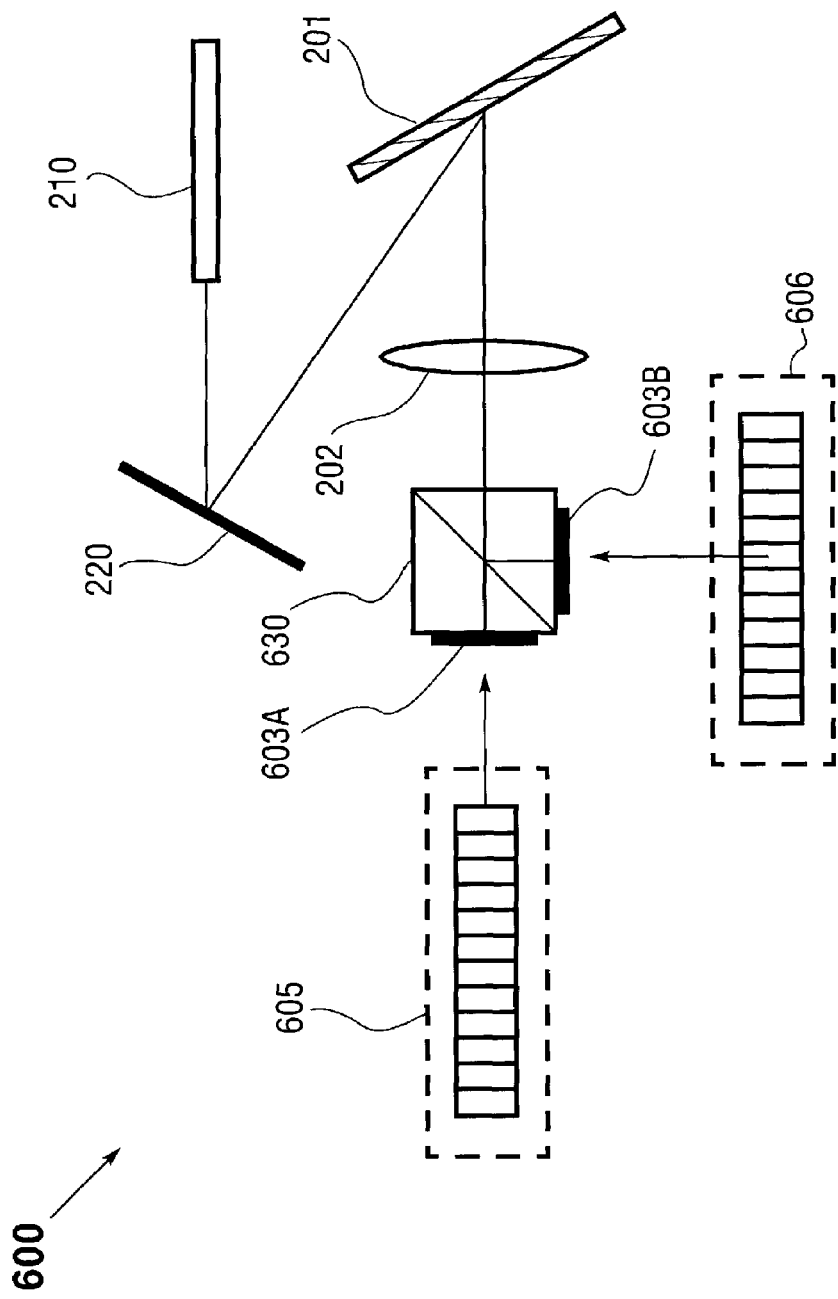
FIGS. 6A–6B show another embodiment of a WIR apparatus of the present invention.

There may be applications where the first and second channel micromirror arrays are desired to be in close proximity to the channel-interleaving assembly, without involving an augmented relay system. (Such a configuration may yield a smaller device footprint, for instance.) FIG. 6A shows another embodiment of a WIR apparatus pertaining to this situation, according to the present invention. By way of example, WIR apparatus 600 may be built upon and share a number of elements used in the embodiment of FIG. 2D, as indicated by those elements identified by the same numerals. As in this case of FIG. 2D, a channel-interleaving assembly 630 may be adapted to allow the "odd" spectral channels to pass though and thereafter impinge onto a first array 603A of channel micromirrors, while reflecting the "even" spectral channels onto a second array 603B of channel micromirrors. Dashed boxes 605, 606 further provide schematic front views of the first and second arrays 603A, 603B of channel micromirrors, respectively. The remaining operation of the WIR apparatus 600 may be substantially similar to that described above with respect to the embodiment of FIG. 2D.

Figure 6B:
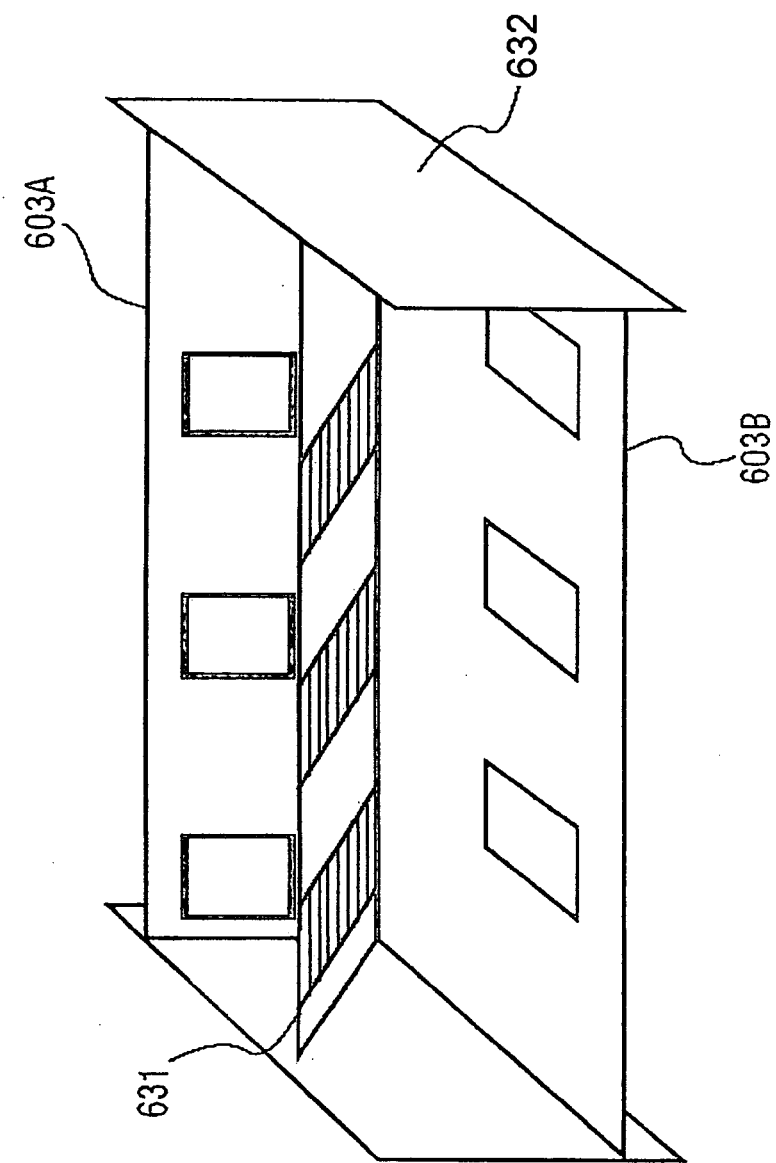

In FIG. 6A, the channel-interleaving assembly 630 may comprise an array of alternating transmissive and reflective elements, where the transmissive and reflective elements may correspond respectively with the "odd" and "even" spectral channels, for instance. As a way of example, FIG. 6B shows an exemplary embodiment of how the channel-interleaving assembly 630 along with the channel micromirror arrays 603A, 603B may be arranged. The channel-interleaving assembly 630 may comprise a "channel mask" 631 having alternating "holes" (for transmission) and reflective surfaces (as marked by hatched areas). The channel mask 631 may be positioned at 45-degrees with respect to the first or second channel micrmirror arrays 603A, 603B. For ease of alignment, the channel mask 631 along with the first or second channel micrmirror arrays 603A, 603B may be mounted on a fixture 632.

Alternatively, the channel mask 631 may be interposed between diagonal "faces" of first and second right-angle prisms (e.g., made of silicon or glass) known in the art. The first or second channel micrmirror arrays 603A, 603B may be mounted respectively on two side "faces" of first and second prisms that are oriented at 90-degrees, e.g., in a manner as illustrated in FIG. 6B. Such an arrangement helps "shrink" the optical path lengths between the channel-interleaving assembly and the respective channel micromirrors in FIG. 6A.

In the present invention, the wavelength-separator 201 may generally be a ruled diffraction grating, a holographic diffraction grating, an echelle grating, a curved diffraction grating, a transmission grating, a dispersing prism, or other wavelength-separating means known in the art. The beam-focuser 202 may be a single lens, an assembly of lenses, or other beam-focusing means known in the art. The channel micromirrors 203 may be silicon micromachined mirrors, reflective ribbons (or membranes), or other types of dynamically adjustable mirrors known in the art. Each channel micromirror may be pivotable about one or two axes. The collimator-alignment mirrors 220 may also be silicon micromachined mirrors, or other types of beam-deflecting means known in the art, each being pivotable about one or two axes. It will be appreciated that the channel micromirrors described above may be replaced by other types of beam-steering (e.g., electro-optic based beam-steering) elements known in the art, that are capable of dynamically steering the spectral channels in a substantially equivalent manner.

Those skilled in the art will recognize that the exemplary embodiments described above are provided by way of example to illustrate the general principles of the present invention. Various means and methods can be devised herein to perform the designated functions in an equivalent manner. Moreover, various changes, substitutions, and alternations can be made herein without departing from the principles and the scope of the invention. Accordingly, the scope of the present invention should be determined by the following claims and their legal equivalents.

What is claimed is:

1. An apparatus comprising:
    an input port for a multi-wavelength optical signal including N spectral channels, each of said spectral channels corresponding to a unique wavelength, and a plurality of output ports;
    a diffraction grating that spatially separates said multi-wavelength optical signal by wavelength into said N spectral channels;
    a beam focuser that focuses said spectral channels;
    at least first and second arrays of channel micromirrors, corresponding respectively with at least first and second channel groups, each of said channel micromirrors being individually controllable to direct a corresponding spectral channel into a selected one of any of at least two of said output ports;

a channel-interleaving assembly that interleaves said spectral channels separated by said diffraction grating into said at least first and second channel groups, wherein said at least first and second channel groups each include at least two spectral channels, directing unique ones of said spectral channels onto corresponding unique ones of said channel micromirrors of said at least first and second arrays.

2. The apparatus of claim 1 further comprising an augmented relay system, wherein said augmented relay system comprises first, second and third relay lenses, configured such that said second and third relay lenses correspond with said first and second channel groups, respectively.

3. The apparatus of claim 1 further comprising an augmented relay system, wherein said augmented relay system comprises first and second relay lenses, and first and second beam-deflecting elements optically interposed between said first and second relay lenses, configured such that said first and second beam-deflecting elements correspond with said first and second channel groups, respectively.

4. The apparatus of claim 3 wherein either of said first and second beam-deflecting elements comprises a prism.

5. The apparatus of claim 1 wherein said channel-interleaving assembly comprises an array of beam-deflecting elements, arranged alternately in a one-to-one correspondence with said spectral channels.

6. The apparatus of claim 5 wherein said array of beam-deflecting elements is provided by a diffraction grating.

7. The apparatus of claim 5 wherein said array of beam-deflecting elements comprises an array of prisms.

8. The apparatus of claim 1 wherein said channel-interleaving assembly comprises an array of alternating transmissive and reflective elements, configured to allow said first channel group to pass through and to reflect second channel group.

9. The apparatus of claim 8 further comprising an augmented relay system, wherein said augmented relay system comprises first, second, third, and fourth relay lenses, configured such that said first and second relay lenses correspond with said first channel group, and said third and fourth relay lenses correspond with said second channel group.

10. The apparatus of claim 8 wherein said channel-interleaving assembly further comprises a beam-reflector, for re-directing said second channel group so that said first and second channel groups propagate in parallel.

11. The apparatus of claim 1 further comprises first and second arrays of beam-attenuating elements, in close proximity respectively to said first and second arrays of channel micromirrors, wherein said first and second arrays of beam-attenuating elements are operative to dynamically control optical power levels of said first and second channel groups, respectively.

12. The apparatus of claim 11 wherein either of said first and second arrays of beam-attenuating elements comprises liquid-crystal based variable optical attenuators.

13. The apparatus of claim 1 wherein each channel micromirror is continuously pivotable about at least one axis.

14. The apparatus of claim 1 wherein said beam-focuser focuses said spectral channels separated by said wavelength-separator into corresponding spectral spots on said channel-interleaving assembly, and wherein said apparatus further comprises an augmented relay system adapted to relay said first and second channel groups from said channel-interleaving assembly respectively onto said first and second linear arrays of channel micromirrors, whereby each channel micromirror receives a unique one of said spectral channels.

15. The apparatus of claim 1 further comprising an array of collimator-alignment mirrors, optically interposed between an array of fiber collimators and said diffraction grating, for adjusting alignment of said multi-wavelength optical signal from said input port and for directing said reflected spectral channels into said output ports.

16. The apparatus of claim 15 wherein each collimator-alignment mirror is rotatable about at least one axis.

17. The apparatus of claim 1 wherein said at least first and second linear arrays of channel micromirrors are parallel.

18. The apparatus of claim 1 wherein the channel micromirrors of the first array are aligned with corresponding channel micromirrors of the second array relative to an axis perpendicular to the first and second arrays.

19. The apparatus of claim 1 wherein said at least first and second linear arrays of channel micromirrors are parallel, and wherein first linear array of channel micromirrors overlaps the second linear array of channel micromirrors.

20. An apparatus comprising:
a) an input port for a multi-wavelength optical signal including N spectral channels, each of said spectral channels corresponding to a unique wavelength, and a plurality of output ports;
b) a wavelength-separator that spatially separates, along a first axis, said multi-wavelength optical signal by wavelength into said N multiple spectral channels wherein said wavelength-separator includes an element selected from the group consisting of ruled diffraction gratings, holographic diffraction gratings, echelle gratings, curved diffraction gratings, and dispersing prisms;
c) a beam-focuser that focuses said spectral channels;
d) at least first and second linear arrays of channel micromirrors, corresponding respectively with at least first and second channel groups, wherein said at least first and second linear arrays of channel micromirrors are parallel, wherein the first linear array of channel micromirrors overlaps the second linear array of channel micromirrors along the first axis, said channel micromirrors being individually controllable to direct corresponding spectral channels into selected ones of said output ports; and
e) a channel-interleaving assembly that interleaves said spectral channels demultiplexed by said wavelength separator into said at least first and second channel groups, wherein said at least first and second channel groups each include at least two spectral channels, directing unique ones of said spectral channels onto corresponding unique ones of said channel micromirrors of said at least first and second arrays, wherein the channel interleaving assembly angularly separates said spectral channels corresponding to said first channel group and said second channel group at least along a second axis perpendicular to the first axis.

* * * * *